United States Patent Office 3,736,274
Patented May 29, 1973

3,736,274
DENTURE ADHESIVE
Daniel Schoenholz, Basking Ridge, N.J., and Martin M. Perl, Brooklyn, N.Y., assignors to Foremost-McKesson, Inc., New York, N.Y.
No Drawing. Filed June 1, 1971, Ser. No. 149,078
Int. Cl. C08b 21/32
U.S. Cl. 260—17 R          4 Claims

ABSTRACT OF THE DISCLOSURE

An effective denture composition is disclosed which comprises a maleic anhydride and/or acid copolymer, a polymeric N-vinyl lactam and sodium carboxymethylcellulose.

BACKGROUND OF THE INVENTION

This invention relates generally to partially-soluble denture adhesive compositions and to the method of using same for securing artificial dentures in the mouth. More particularly, it relates to highly effective denture adhesive compositions comprising a maleic anhydride copolymer, a polymeric N-vinyl lactam and sodium carboxymethylcellulose, preferably incorporated into a diluent such as petrolatum and/or mineral oil.

Removable dentures, dental plates and the like consist of artificial teeth mounted in a suitable base material, usually acrylic plastics, that is molded to conform to the oral cavity. Theoretically, if a perfect fit is obtained, there is no need for the use of stabilizers (denture adhesives) for keeping these dentures in place. This, however, is rarely realized in actual practice because of natural changes in the configuration of the oral cavity and wear of the dentures over periods of time. The use of stabilizers to fill the interstices between the denture and oral tissue has therefore become necessary and a general practice. These materials are available in the forms of powders, creams or gels. They serve as cushions or gaskets between the denture and the gums and/or plate. In addition to the cushion or gasket effect, such compositions are generally comprised of swellable gums that develop a degree of adhesive and cohesive characteristics when they come in contact with the saliva, thus enhancing the security of the denture.

The most commonly used compositions are based on finely divided particles of gum Karaya in dry powder form or as a paste based on petrolatum and mineral oil. Additives which might be included for other purposes include color, flavor, pH stabilizers, bactericides, preservatives, etc. Other requirements for obtaining a satisfactory denture stabilizer include no odor, no impalatable taste or mouthfeel and safety during contact with the mucous tissues found in the mouth.

Other natural gums derived from vegetable and animal sources that have been reported in denture stabilizers include tragacanth, locust bean, pectin, agar, gelatin and seaweed extracts. Synthetic materials have been more recently explored for obvious reasons of economics, availability and better control of product uniformity. They include such water soluble polymers in the class of cellulose derivatives, polyethylene oxide polymers and partial salts of lower alkyl vinyl ether-maleic anhydride type copolymers.

Requirements and characteristics for a satisfactory denture composition are many and dictated by numerous factors. Desirably, one daily application of such a composition should function as an effective means for insulating, cushioning and securely positioning the denture. The composition should retain its characteristics and properties in the powder and cream forms during storage under various climatic conditions, such as temperature and humidity; be readily and easily capable of application to the denture surface; not be irritating or uncomfortable to the user; be safe and nontoxic; have no disagreeable odor or color; have no unpalatable taste; provide antiseptic and germicidal properties for preventing or inhibiting the growth of organisms ordinarily found in the mouth; and function as a deodorant or agent for prevention of putrefaction or malodorous decomposition of foods of secretions lodging beneath or adjacent to the denture. The material must be capable of imbibing water and saliva and swelling, so as to fill the interstices between the denture and the gum of mucous tissues. The composition should not attack or damage the denture, as by causing a crazing of the denture-plate material. Additionally, the composition should be stable to moderate heat or cold, bacteria, molds and enzyme systems found in the oral cavity. The mechanical strength of the gel or colloid formed by imbibition of water should be great enough to securely maintain the position of the denture under normal use, and not so great as to make denture removal difficult when desired, or as to damage or injure the gums, tissues or denture upon removal.

SUMMARY OF THE INVENTION

It is the purpose of this invention to provide a highly effective and novel denture composition which comprises:

(a) A polymeric material selected from the group consisting of lower alkyl vinyl ether-maleic anhydride and/or acid copolymers, said alkyl group containing from 1 to 4 carbon atoms, styrene-maleic anhydride and/or acid copolymers and ethylene-maleic anhydride and/or acid copolymers having a molecular weight in the range from 400 to 2,000,000 and present in an amount to provide from 5% to about 75% by weight of the total composition;

(b) A polymeric N-vinyl lactam selected from the group consisting of (poly-1-vinyl-2-pyrrolidone), (poly-1-vinyl-5-methyl-2-pyrrolidone), (poly - vinyl-2-piperidone) and (poly-N-vinyl-ε-caprolactam) having a molecular weight in the range from 10,000 to 360,000 and present in an amount to provide from 5% to about 75% by weight of the total composition; and (c) Sodium carboxymethylcellulose present in an amount to provide from 10% to about 90% by weight of the total composition; the resulting composition exhibiting a pH in the range from 3 to 6 when measured as a 1% by weight aqueous dispersion.

Another preferred embodiment of the above shown composition is its incorporation into a diluent. Said diluent serves as a base for the active ingredients and is therefore a nonsolvent for those active components. Useful diluents include petrolatum, mineral oil, mixtures thereof, etc.

Another preferred embodiment of this invention is a composition as described above consisting of methyl vinyl ethermaleic anhydride and/or acid copolymer, (poly-1-vinyl-2-pyrrolidone) and sodium carboxymethylcellulose.

Still another preferred aspect of this invention concerns the utilization of the aforedescribed composition for securing artificial dentures in the oral cavity.

DETAILED DESCRIPTION OF THE INVENTION

It has been discovered that by combining certain ingredients, a highly effective denture composition is obtained having properties not found heretofore. The composition of this invention contains three essential components, combined in specific ratios, to form a partially water soluble mixture or dispersion having a pH in the range from 3 to 6 when measured as a 1% by weight aqueous dispersion.

More specifically, the herein disclosed composition contains (a) a maleic anhydride and/or acid copolymers; (b) a polymeric N-vinyl lactam; and (c) sodium carboxymethylcellulose.

The preferred percent by weight range for each of these components based on the total composition is as follows:

| | Percent by weight |
|---|---|
| Component (a) | 5 to 75 |
| Component (b) | 5 to 75 |
| Component (c) | 10 to 90 |

Even more preferred are the following corresponding ranges:

| | Percent by weight |
|---|---|
| Component (a) | 10 to 40 |
| Component (b) | 10 to 40 |
| Component (c) | 25 to 75 |

The pH of these compositions when dispersed in water at 1% by weight concentration will range from 3 to 6, with a pH range of 4 to 5 preferred.

When a diluent or carrier is combined with the aforeshown ingredients, it preferably constitutes from 40% to about 60% by weight of the entire mixture.

With regard to component (a), designated as a maleic anhydride and/or acid copolymer, the present disclosure contemplates using maleic anhydride as one of the reacting monomers in forming such materials. The other momomeric reagent is an olefin, such as methylvinyl ether, ethylene or styrene.

When maleic anhydride is copolymerized with an alkyl vinyl ether, polymeric materials having the following recurring structural unit results:

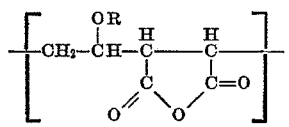

wherein R is lower alkyl (1–4 carbon atoms).

Similarly, when maleic anhydride is polymerized with an olefin, compounds having the following recurring structural unit are obtained:

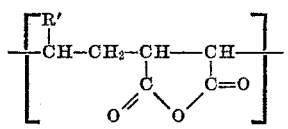

wherein R' is H (ethylene-maleic anhydride copolymer) or phenyl (styrene-maleic anhydride copolymer). Other olefins capable of copolymerizing with maleic anhydride to provide compounds having recurring units of the type shown above are within the purview of this invention.

It should be recognized that the critical feature of such copolymers is the portion containing the anhydride moiety. In this connection, it should be realized that although the anhydride form is shown, it is possible to convert it to the corresponding di-carboxylic acid configuration. Both forms are within the scope of this invention. For sake of convenience, however, the anhydride is referred to since that is the configuration usually found in the copolymer as prepared.

Actually, the preferred configuration is the acid form because it reacts more rapidly than the anhydride thereby resulting in an accelerated adhesion step under conditions of use. Accordingly, when the phrase "anhydride and/or acid" appears, it is meant to include the anhydride form:

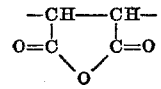

as well as the acid form:

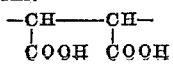 (Preferred)

Therefore, one may utilize either material in preparing the herein disclosed compositions. For the reasons outlined above, it is advantageous to use the diacid material. In any event, under conditions of use, the anhydride form is normally converted to the acid form. Hence, the copolymer, for purposes of the invention, can exist in the anhydride, diacid or partially hydrolysed form. It is known that reactive carboxy and anhydride groups found on polymers of the type above undergo the usual reactions such as hydrolysis and salt formation. Actually, transformations of this nature take place even before the copolymer is subjected to conditions of use. For example, in the presence of an amine or amine-like material, the anhydride bond can break. It can also rupture in the presence of a salt or other anionic species.

The maleic anhydride and/or acid copolymers which constitute one of the essential components of the subject denture composition are either commercially available or can be prepared from well-known and established procedures. For purposes of this invention, the desired molecular weight for these copolymers is in the range of 400 to about 2,000,000, with a preferred range being 250,000 to 1,250,000.

The second important component of the herein disclosed denture composition is designated as a polymeric N-vinyl lactam. Representative examples include (poly-1-vinyl-2-pyrrolidone), (poly-1-vinyl-5-methyl-2-pyrrolidone), (poly-1-vinyl-2-piperidone) and (poly-N-vinyl-ε-caprolactam). These materials are abundantly described in the chemical literature as well as their preparation. They are stated to have molecular weights ranging from 10,000 to 360,000. The aforesaid molecular weight range is applicable for purposes of this invention, however, a preferred range is from 40,000 to 160,000.

It is known that N-vinyl lactams of the kind just described can be water-insolubilized by reacting them with a polymeric carboxylic acid compound such as a vinyl ether-maleic anhydride copolymer (in the acid form). The resulting products are "complex" polymers which are insoluble in water and in a large number of solvents.

Because of their degree of insolubility, these "complex" polymers cannot be used in the herein described denture application, i.e., as a denture adhesive.

The ability to convert these products into useful denture compositions resides in the partial solubilization which takes place in the presence of sodium carboxymethylcellulose, the third essential ingredient of the subject compositions.

Carboxymethylcellulose (CMC) acts in a way as to prevent the maleic anhydride copolymer N-vinyl lactam complex from completely precipitating when placed in water. It is this ability which enables one to obtain highly effective denture compositions.

Blends of the three components, (a), (b) and (c), form dispersions when placed in water. Moreover, it is found that these blends, to be effective, are characterized by having a pH in the range from 3 to about 6 when measured as 1% by weight aqueous dispersions. Even more effective are blends which provide a pH of 4 to 5 as 1% by weight aqueous dispersions.

In addition to providing the necessary water solubilization property, CMC imparts mucilage properties leading to a desirable "cushioning effect" during conditions of use. In addition, CMC acts as a filler in the final adhesive paste and thereby greatly reduces raw material costs.

The combined three essential ingredients are preferably blended and dispersed in a nonsolvent vehicle. For instance, they may be mixed with petrolatum and/or mineral oil to form an adhesive paste. However, it is possible and within the ambit of this inventon to use the subject compositions in the form of a powder without incorporation of a diluent. When applied in this manner, i.e., as a dry blend, the adhesive action which takes place during actual use occurs in situ. The activation for the formation of the adhesive complex is provided by the saliva in the mouth.

The preparation of the dry blend can be accomplished by any technique known in the art which allows effective distribution of component materials.

Other materials may also be included in the denture compositions of this invention. Of course, they must be non-reactive and compatible with the three essential ingredients and nontoxic and nonirriating in the amounts and frequency of use normally encountered. Typical materials which fall into this category include: coloring agents, flavoring agents, pH stabilizers, antibacterial agents, antifungal agents, special deodorants and perfumes, suspension agents, dispersion agents, inert fillers, etc.

EXAMPLE I

The following compositions are prepared by dry blending:

| Dry powder | Denture adhesives, percent by weight | | | | | | | | | |
|---|---|---|---|---|---|---|---|---|---|---|
| | 1 | 2 | 3 | 4 | 5 | 6 | 7 | 8 | 9 | 10 |
| Carboxymethyl cellulose (CMC) | 10.0 | 10.0 | 10.0 | 20.0 | 40.0 | 50 | 60.0 | 70.0 | 80.0 | 90.0 |
| Polymethylvinyl ether maleic acid co-polymer (PVM/MA) | 18.0 | 72.0 | 45.0 | 40.0 | 30.0 | 25.0 | 20.0 | 15.0 | 10.0 | 5.0 |
| Polyvinyl pyrrolidone (PVP) | 72.0 | 18.0 | 45.0 | 40.0 | 30.0 | 25.0 | 20.0 | 15.0 | 10.0 | 5.0 |
| pH of 1% aqueous dispersion | 4.0 | 3.1 | 3.4 | 3.7 | 4.2 | 4.4 | 4.6 | 4.8 | 5.1 | 5.6 |

The PVM/MA component used in these preparations has a molecular weight of approximately 1,250,000 and the PVP a molecular weight of approximately 40,000.

EXAMPLE II

A denture paste is prepared having the following composition:

Ingredient: Percent by weight
- Petrolatum U.S.P. _____ 35.0
- Mineral oil N.F. _____ 15.0
- CMC _____ 25.0
- PVM/MA _____ 12.5
- PVP _____ 12.5

EXAMPLE III (A) Dry powders and the paste as shown in Examples I and II are prepared wherein the following copolymeric acids are used, in equivalent amounts, in lieu of PVM/MA. Suitable compositions are obtained:

Butylvinyl ether _____ Maleic acid copolymer.
Ethylene _____ Do.
Styrene _____ Do.

(B) In a similar fashion, the powders and paste are prepared wherein the following polymeric N-vinyl lactams are used, in equivalent amounts, in place of PVP. Suitable compositions are obtained:

poly-1-vinyl-5-methyl-2-pyrrolidone
poly-1-vinyl-2-piperidone
poly-N-vinyl-ε-caprolactam

What is claimed is:
1. A denture composition effective for securing artificial denture in the mouth which comprises:
'(a) a polymeric material selected from the group consisting of lower alkyl vinyl ether-maleic anhydride and/or acid copolymers, said alkyl group containing from 1 to 4 carbon atoms, styrene-maleic anhydride and/or acid copolymers and ethylene-maleic anhydride and/or acid copolymers having a molecular weight in the range from 400 to 2,000,000 and present in an amount to provide from 5% to about 75% by weight of the total composition;
(b) a polymeric N-vinyl lactam selected from the group consisting of (poly-1-vinyl-2-pyrrolidone), (poly-1-vinyl-5-methyl-2-pyrrolidone), (poly-1-vinyl-2-piperidone) and (poly-N-vinyl-ε-caprolactam) having a molecular weight in the range from 10,000 to 360,000 and present in an amount to provide from 5% to about 75% by weight of the total composition; and
(c) sodium carboxymethylcellulose present in an amount to provide from 10% to about 90% by weight of the total composition; the resulting composition exhibiting a pH in the range from 3 to 6 when measured as a 1% by weight aqueous dispersion.

2. The composition of claim 1 containing in combination therewith, an inert, nontoxic diluent selected from the group consisting of petroleum and mineral oil and mixtures thereof, in an amount to provide from 40% to 60% by weight of the total resulting composition.

3. The composition of claim 1 wherein said polymeric material is methyl vinyl ether-maleic acid copolymer having a molecular weight of about 1,250,000 and comprising about 25% by weight of the total composition; said polymeric N-vinyl lactam is (poly-1-vinyl-2-pyrrolidone) having a molecular weight of about 40,000 and comprising about 25% by weight of the total composition; and said sodium carboxymethylcellulose comprises about 50% by weight of said composition.

4. The composition of claim 3 wherein a mixture of mineral oil and petrolatum, on a 15 to 35 weight ratio, is added comprising about 50% by weight of the total composition.

References Cited
UNITED STATES PATENTS

| 2,901,457 | 8/1959 | Stoner et al. | 260—17 R |
| 3,003,988 | 10/1961 | Germann et al. | 260—33.6 UA |
| 3,440,065 | 4/1969 | La Via | 106—35 |
| 3,492,254 | 1/1970 | Strand | 260—17 R |
| 3,511,791 | 5/1970 | Puetzer et al. | 260—17.4 ST |

WILLIAM H. SHORT, Primary Examiner

L. M. PHYNES, Assistant Examiner

U.S. Cl. X.R.

260—33.6 UA; 424—80